(12) United States Patent
Sawchuk

(10) Patent No.: US 9,322,690 B2
(45) Date of Patent: Apr. 26, 2016

(54) METERING TUBES FOR IMPROVED FLUID FLOW MEASUREMENT

(71) Applicant: Canada Pipeline Accessories, Co., Ltd., Calgary (CA)

(72) Inventor: Blaine Sawchuk, Calgary (CA)

(73) Assignee: Canada Pipeline Accessories, Co. Ltd, Calgary, Alberta (CA)

( * ) Notice: Subject to any disclaimer, the term of this patent is extended or adjusted under 35 U.S.C. 154(b) by 0 days.

(21) Appl. No.: 14/166,599

(22) Filed: Jan. 28, 2014

(65) Prior Publication Data

US 2014/0208868 A1 Jul. 31, 2014

Related U.S. Application Data

(60) Provisional application No. 61/757,469, filed on Jan. 28, 2013.

(51) Int. Cl.
*G01F 1/66* (2006.01)

(52) U.S. Cl.
CPC ..................... *G01F 1/662* (2013.01)

(58) Field of Classification Search
CPC ........ G01F 1/66; G01F 1/667; G01F 25/0007
USPC .............................. 73/861.28, 861.31, 861.25
See application file for complete search history.

(56) References Cited

U.S. PATENT DOCUMENTS

| 3,635,081 | A | * | 1/1972 | Gibbs | 73/152.31 |
| 4,550,594 | A | * | 11/1985 | Engstrom | 73/61.53 |
| 5,275,060 | A | * | 1/1994 | Lynnworth | 73/861.18 |
| 6,047,602 | A | * | 4/2000 | Lynnworth | 73/632 |
| 6,474,165 | B1 | * | 11/2002 | Harper et al. | 73/623 |
| 7,047,822 | B2 | | 5/2006 | Good et al. | |
| 7,373,808 | B2 | | 5/2008 | Zanker et al. | |
| 8,561,480 | B2 | | 10/2013 | Lawrence | |
| 8,689,638 | B2 | * | 4/2014 | Shen | 73/861.25 |
| 2003/0101804 | A1 | * | 6/2003 | Zanker | 73/105 |
| 2006/0193583 | A1 | * | 8/2006 | Dong et al. | 385/127 |
| 2006/0272417 | A1 | * | 12/2006 | Zanker et al. | 73/592 |
| 2008/0053243 | A1 | | 3/2008 | Kimball et al. | |

(Continued)

FOREIGN PATENT DOCUMENTS

| EP | 2469244 A1 | 6/2012 |
| EP | 2103818 B1 | 9/2013 |
| WO | 9922207 A1 | 5/1999 |

OTHER PUBLICATIONS

Sawchuk, B.D., and Sawchuk, D.P., "Gas Flow Conditioning," Flow Conditioning and Effects on Accuracy for Fluid Flow Measurement—American School of Gas Measurement, 2006, 1-11, Houston.

(Continued)

*Primary Examiner* — Jewel V Thompson
(74) *Attorney, Agent, or Firm* — Cahn & Samuels, LLP

(57) ABSTRACT

A meter tube assembly for use with an ultrasonic flow meter is provided. The meter tube assembly includes a pipe spool having an extremely rough first section including an interior surface with a relative roughness ($\epsilon/D$) of 1% or greater. Fluid passing through the extremely rough section exhibits a flow profile that remains substantially constant over the range of Reynolds numbers. As such, ultrasonic flow meters can be simplified as they need not account for different Reynolds numbers.

13 Claims, 5 Drawing Sheets

(56) References Cited

U.S. PATENT DOCUMENTS

2012/0247223 A1\* 10/2012 Sawchuk et al. .............. 73/861
2012/0255343 A1\* 10/2012 Sarma et al. ............ 73/40.5 R
2012/0318399 A1 12/2012 Yao et al.

OTHER PUBLICATIONS

Tezuka, K., Mori, M., Suzuki, T., Aritomi, M., Kikura, H., and Takeda, Y., "Assessment of Effects of Pipe Surface Roughness and Pipe Elbows on the Accuracy of Meter Factors Using the Ultrasonic Pulse Doppler Method," Journal of Nuclear Science and Technology, 2008, 304-312, 45-4, Atomic Energy Society of Japan, Japan.

\* cited by examiner

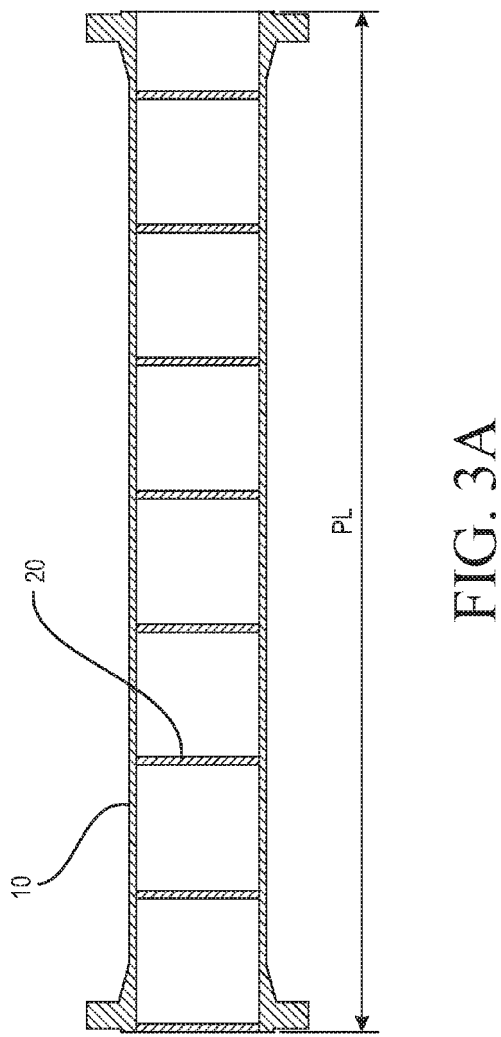
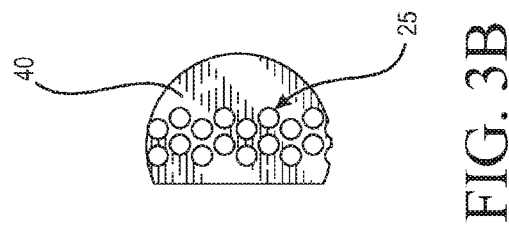
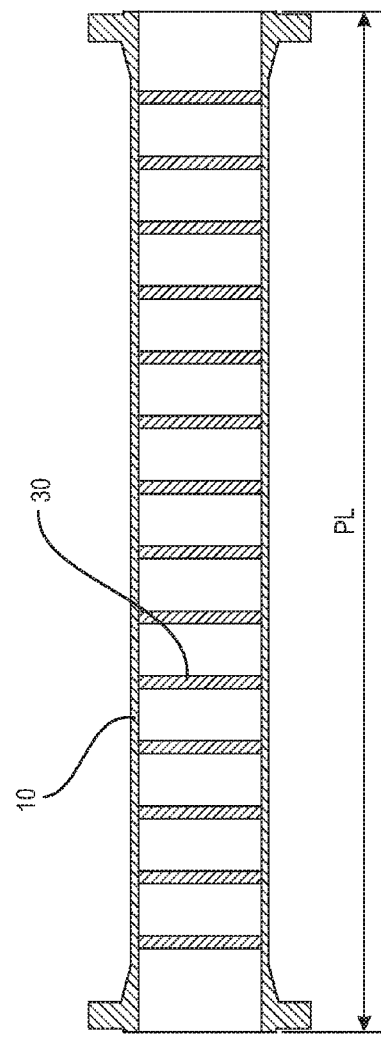
FIG. 3A
FIG. 3B
FIG. 4

METERING TUBES FOR IMPROVED FLUID FLOW MEASUREMENT

This application claims priority of provisional application No. 61/757,469 filed on Jan. 28, 2013 in the U.S. Patent and Trademark Office, the entirety of which is incorporated by reference herein.

I. FIELD OF THE INVENTION

This invention relates to fluid flow measurement devices and methods, and, more particularly to metering tubes and methods.

II. BACKGROUND OF THE INVENTION

Pipelines are used to transport fluids in various industries, including chemical, oil and gas, and manufacturing. These industries use processes that require fluid flow rates to be accurately measured. These measurements are performed at locations known as meter stations. Typical meter stations comprise a meter tube provided with a flow conditioner and a flow meter, e.g., an ultrasonic flow meter, operatively coupled with the meter tube to measure fluid flow.

Flow meters function in different ways. They can use: differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity profile, a velocity flow profile or a flow profile.

Ultrasonic meters are frequently designed to operate optimally within particular Reynolds Number ranges. Reynolds Numbers for several products for which an ultrasonic meter may be used to measure are shown in FIG. 1. Use of an ultrasonic flow meter to measure fluid flow for a product in a Reynolds Number range for which the ultrasonic meter is not rated can lead to inaccurate measurements.

While industry has recognized the measurement challenges presented in measuring flow profiles over the range of Reynolds Numbers, industry has focused its efforts on improving ultrasonic meter design using complex calibration algorithms and virtually ignored the role of the meter tube in measurement process.

Accordingly, there is a need for metering tubes that improve the accuracy of ultrasonic flow meters.

III. SUMMARY OF THE INVENTION

It is an object of the invention to provide a meter tube that improves the accuracy of ultrasonic flow meters.

It is another object of the invention to provide meter tube that minimizes the relationship between flow profile and Reynolds number.

It is a further object of the invention to provide a meter tube that produces a relatively uniform flow profile across the range of Reynolds numbers.

It is yet a further object of the invention to provide a meter tube that reduces the need to calibrate ultrasonic flow meters.

In accordance with an embodiment of the invention a stretcher hoist includes a body support having a head end and a foot end. A set of vertical hoist straps of a first length are attached to the head end of the body support. A plurality of horizontal hoist straps of a second length are attached to the underside of the body support. A plurality of inner straps are attached to the top side of the body support. A plurality of closure straps are attached to the underside of the body support along an edge of the body support. A foot pocket is disposed at the foot end of the body support, the foot pocket includes top and bottom members, the bottom member includes first and second handle apertures for receiving stretcher handles.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

IV. BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A depicts a meter tube assembly in accordance with an embodiment of the invention.

FIG. 3B shows a liner for the meter tube assembly of FIG. 3A.

FIG. 4 shows a meter tube assembly in accordance with an embodiment of the invention.

V. DETAILED DESCRIPTION OF THE DRAWINGS

Figure 1:
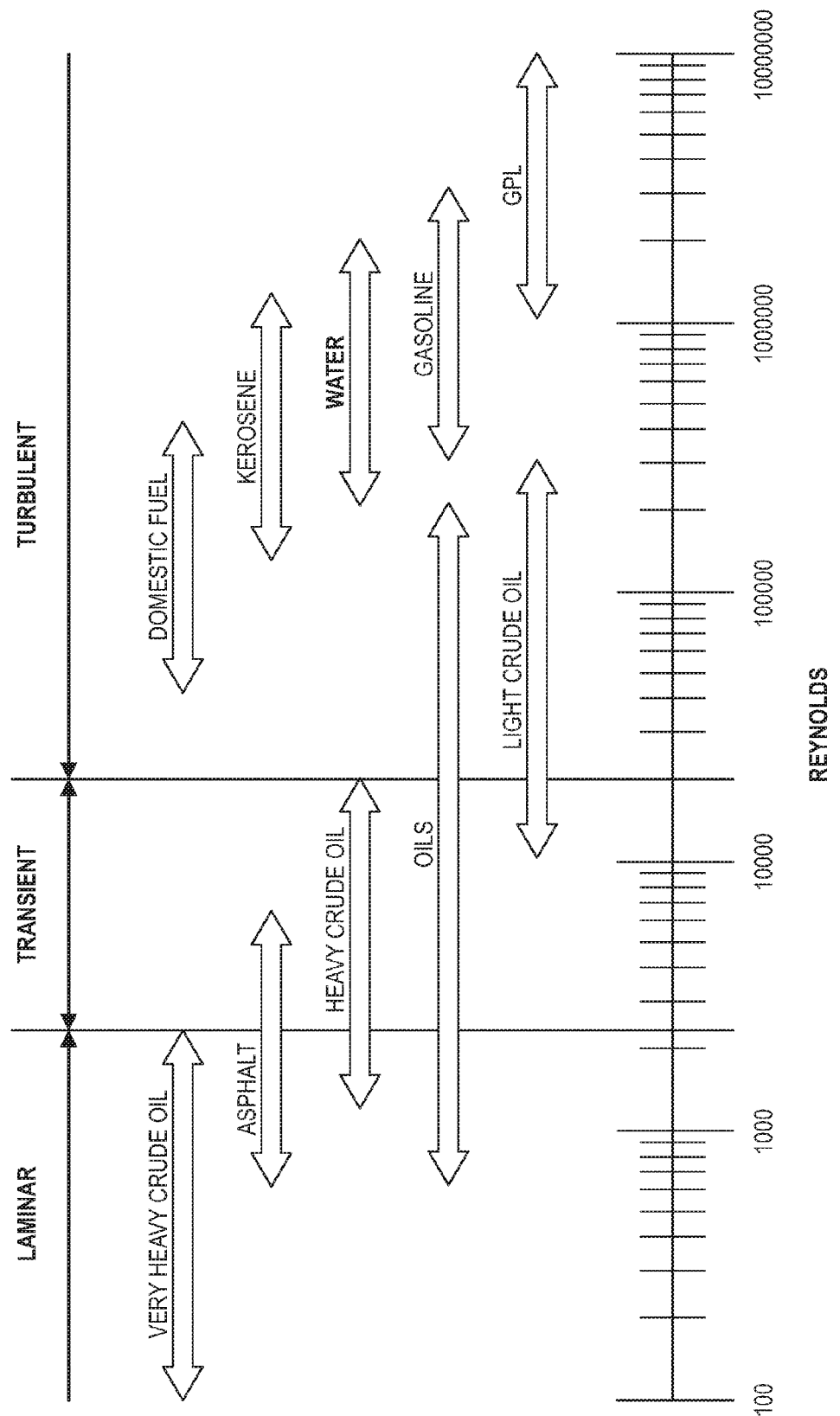
FIG. 1 depicts a diagram of flow profile characteristics.
Figure 2:
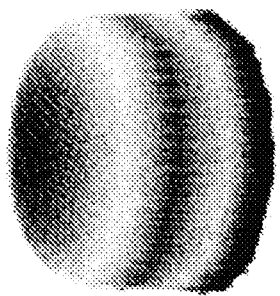
FIG. 2 illustrates flow profiles for a smooth pipe at different Reynolds numbers.
Figure 2:
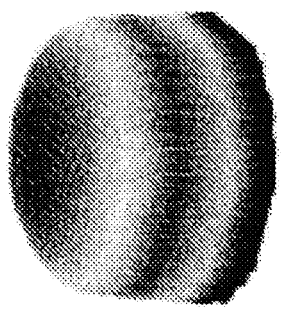
Figure 2:
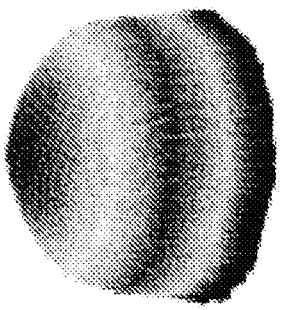
Figure 2:
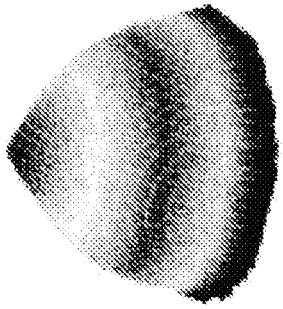

Conventional meter stations are constructed using meter tubes having very low surface roughness, e.g., on the order of 1.5 μm. As illustrated in FIG. 2 flow profiles through such meter tubes do not remain constant over the range of Reynolds numbers.

The present invention provides a meter tube assembly which may be used in ultrasonic meter stations that provides a substantially consistent flow profile across the range of Reynolds Numbers. Through its production of a Reynolds number independent flow profile, the meter tube assembly enhances ultrasonic flow meter accuracy.

In accordance with the invention, the meter tube assembly includes a pipe spool having a section of extreme roughness, i.e., having a relative roughness of greater than or equal to about 1%. As used herein "relative roughness" is defined as the ratio of the mean height of roughness of the meter tube to the meter tube diameter or ε/d.

In one embodiment, as illustrated in FIG. 3A, the meter tube assembly of the present invention includes a pipe spool 10 having a pipe length PL and a wall thickness T. A liner 20 is disposed within pipe spool 10. To create a section of extreme roughness, liner 20 comprises a fabricated perforated plate structure fixedly attached to the pipe spool. In keeping with the invention, liner 20 may be welded to pipe spool 10 proximate to the ends of pipe spool 10. Other methods of attaching liner 20 to pipe spool 10 will be apparent to the skilled artisan.

Liner 20 includes a plurality of holes 25 having diameters that are greater than a thickness of the liner, as illustrated in FIG. 3B. In one embodiment liner 20 has a thickness of about 0.156" (4 mm) and holes 25 have a diameter of about 0.237" (6 mm). One or more holes 25 have a triangular pitch that is greater than the thickness of the liner 20 and greater than the diameter of holes 25. In one embodiment, the triangular pitch is about 0.394" (10 mm). Liner 20 has a length substantially equal to the length of pipe spool 10 and a wall thickness substantially less than the wall thickness of pipe spool 10.

In accordance with another embodiment of the invention, as illustrated in FIG. 4, the meter tube assembly comprises a pipe spool 10 having a section of extreme roughness including a plurality of rings 30 protruding into pipe spool 10 substantially equally spaced from each other along the length of pipe spool 10. One or more rings protrude into pipe spool in such a manner as to create an extremely rough interior pipe surface. In one embodiment, at least one ring protrudes into pipe spool 10 by up to about 0.5" (12.7 mm)

Non-Limiting Prophetic Example

Figure 5:
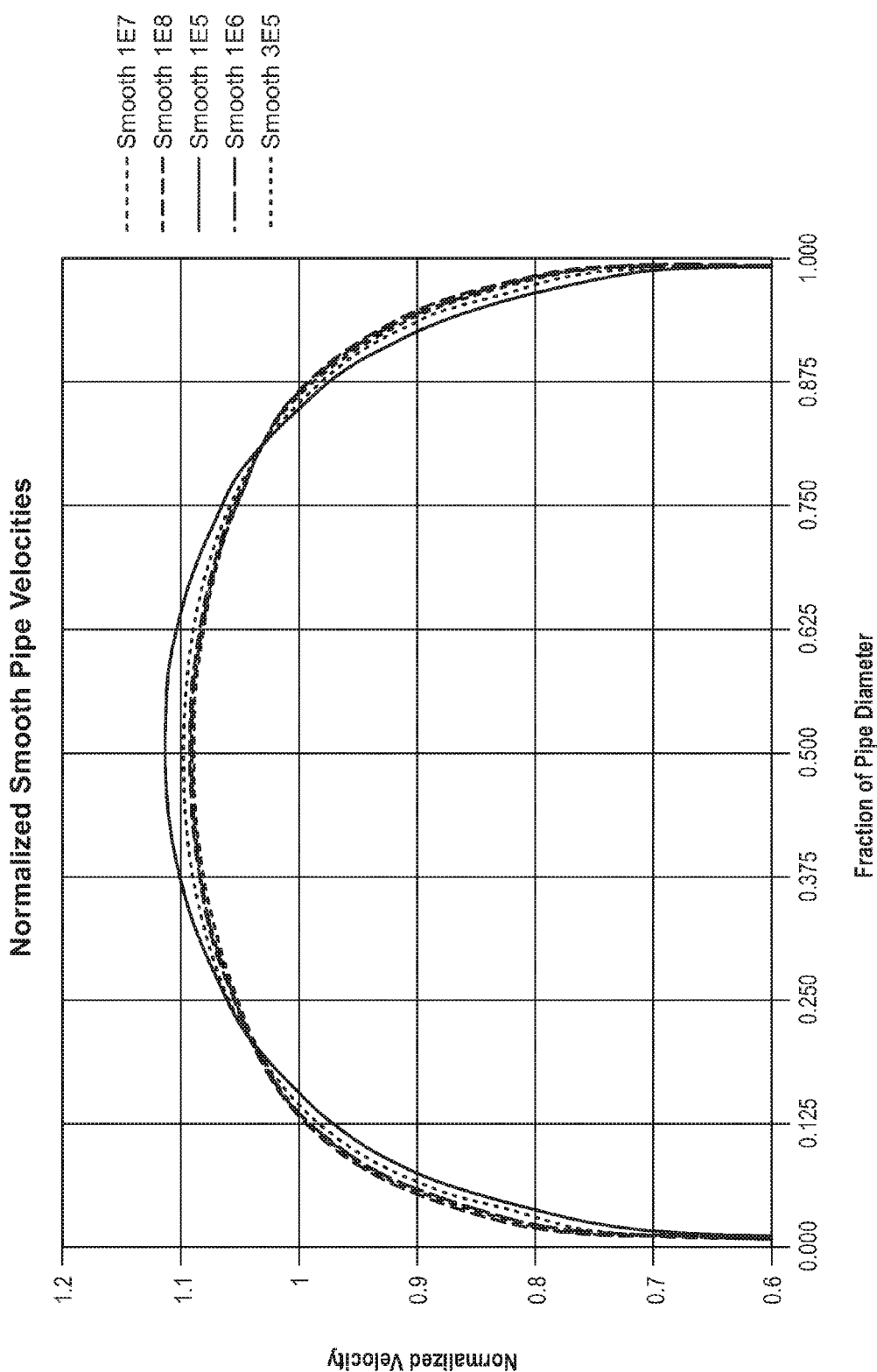
FIG. 5 depicts a plot of normalized smooth pipe velocities.

Using computational fluid dynamics, velocity profiles are calculated for a very smooth meter tube. FIG. 5 illustrates a set of plots of the velocity profiles. Each Reynolds number was obtained by modifying the viscosity, and keeping the same velocity, pipe size and density. Though the profiles are close, there is a noticeable change in profile shape which varies as the Reynolds number diminishes.

Figure 6:
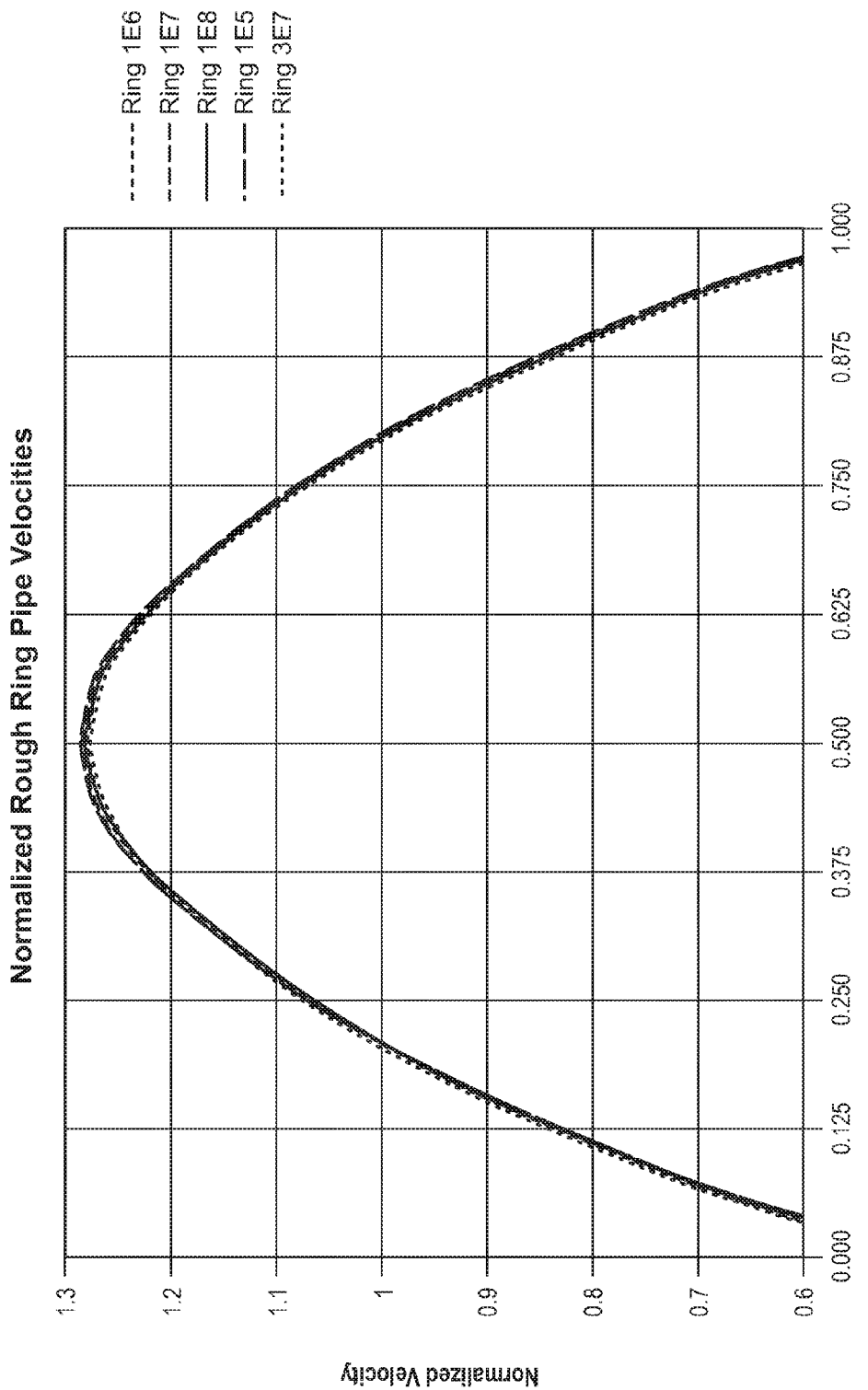
FIG. 6 illustrates a plot of normalized rough pipe velocities.

The same set of simulations is performed for a meter tube having length of about 10 D and having a section of extreme roughness including a plurality of rings, spaced ½ D apart from each other. Each ring is about 0.25" thick and protrudes into the meter tube by about 0.25". The velocity profiles illustrated in FIG. 6 are taken ½ D from the last ring. As illustrated in FIG. 6, the velocity profiles are very peaky, but consistent throughout the range of Reynolds numbers. There is a small difference in profile shape apparent at the center of the meter tube that changes with Reynolds number, but it is very small compared to the smooth pipe velocity.

Although the present invention has been described in terms of particular exemplary and alternative embodiments, it is not limited to those embodiments. For example, the extremely rough section of pipe spool may be created by, e.g., providing patterns on the interior surface, through step changes in the meter tube, even possibly by the presence of fittings. Further alternative embodiments, examples, and modifications which would still be encompassed by the invention may be made by those skilled in the art, particularly in light of the foregoing teachings.

Those skilled in the art will appreciate that various adaptations and modifications of the preferred and alternative embodiments described above can be configured without departing from the scope and spirit of the invention. Therefore, it is to be understood that, within the scope of the appended claims, the invention may be practiced other than as specifically described herein.

I claim:

1. A meter tube assembly for use with ultrasonic flow meters comprising a pipe spool having a first section including an interior surface with a relative roughness ($\epsilon$/D) of 1% or greater configured such that velocity profiles of fluid passing through said pipe spool are substantially consistent independent of Reynolds numbers.

2. A meter tube assembly for use with ultrasonic flow meters comprising a pipe spool having a first section of about 10 D in length and having a plurality of rings disposed on an interior surface of said first section, each of said plurality of rings spaced about ½ D from each other, wherein velocity profiles of fluid flowing through said meter tube taken ½ D from a last ring are substantially unvarying with respect to Reynolds number.

3. The meter tube assembly of claim 2 wherein at least one of said plurality of rings protrudes into said pipe spool approximately ½ inch.

4. The meter tube assembly of claim 2 wherein at least one of said plurality of rings protrudes into said pipe spool approximately ¼ inch.

5. A meter tube assembly for use with ultrasonic flow meters comprising a pipe spool, and a perforated liner disposed within said pipe spool, the perforated liner including a plurality of holes, each hole having a diameter that is greater than a thickness of said liner and each hole having a pitch that is greater than a diameter of the hole.

6. The meter tube assembly of claim 5 wherein said liner has a length substantially equal to a length of said pipe spool.

7. A method for measuring fluid flow through pressurized pipelines comprising selecting a section of metering tube having a preconfigured relative roughness of greater than or equal to about 1% and measuring fluid flow through the section of metering tube using an ultrasonic meter wherein velocity profiles for the fluid passing through the section of metering tube are substantially constant independent of Reynolds number.

8. The meter tube assembly of claim 5 wherein the perforated plate liner is fixedly attached to the pipe spool.

9. The meter tube assembly of claim 5 wherein said liner has a wall thickness that is less than a wall thickness of said pipe spool.

10. A meter tube assembly for use with ultrasonic flow meters comprising a pipe spool, and a perforated liner disposed within said pipe spool, the perforated liner including a plurality of holes, at least one of said plurality of holes having a diameter that is greater than a thickness of said liner and at least one of said plurality of holes having a pitch that is greater than a diameter of the at least one of the plurality of holes, wherein fluid passing flowing through the perforated liner has velocity profiles that are substantially constant independent of Reynolds number.

11. The meter tube assembly of claim 10 wherein said liner has a length substantially equal to a length of said pipe spool.

12. The meter tube assembly of claim 10 wherein the perforated plate liner is fixedly attached to the pipe spool.

13. The meter tube assembly of claim 10 wherein said liner has a wall thickness that is less than a wall thickness of said pipe spool.

* * * * *